United States Patent [19]
Dixon

[11] 3,712,077
[45] Jan. 23, 1973

[54] AUTOMOBILE AIR CONDITIONING SYSTEM

[76] Inventor: Don P. Dixon, P.O. Box 18237, Serna Station, San Antonio, Tex. 78218

[22] Filed: Sept. 10, 1971

[21] Appl. No.: 179,364

[52] U.S. Cl. ..................................62/243, 62/244
[51] Int. Cl. .............................................B60h 3/04
[58] Field of Search................62/239, 241, 243, 244

[56] References Cited

UNITED STATES PATENTS 3,381,493  5/1968  Dixon.....................................62/244
3,494,540  2/1970  Dixon..................................62/244 X Primary Examiner—William J. Wye
Attorney—W. F. Hyer et al.

[57] ABSTRACT

A condenser assembly of an air conditioning system for an automobile in which a coil is mounted behind a ventilated grill across the front end of the automobile with its upper end opposite the front end of a spare tire compartment spaced rearwardly of the upper portion of the grill, and a fan is mounted in a space between the lower portion of the grill and a frame wall below and spaced rearwardly of the front end of the spare tire compartment so as to draw air through the coil.

12 Claims, 7 Drawing Figures

PATENTED JAN 23 1973

Don P. Dixon
INVENTOR.

BY Hyer, Eickenroht,
Thompson & Turner
ATTORNEYS

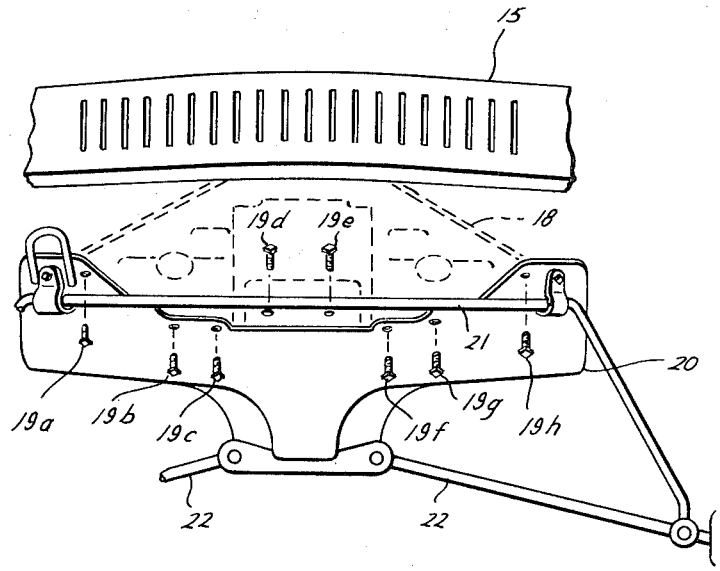
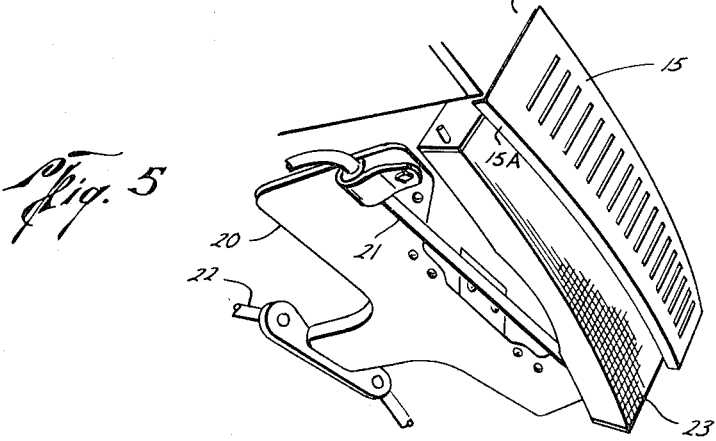
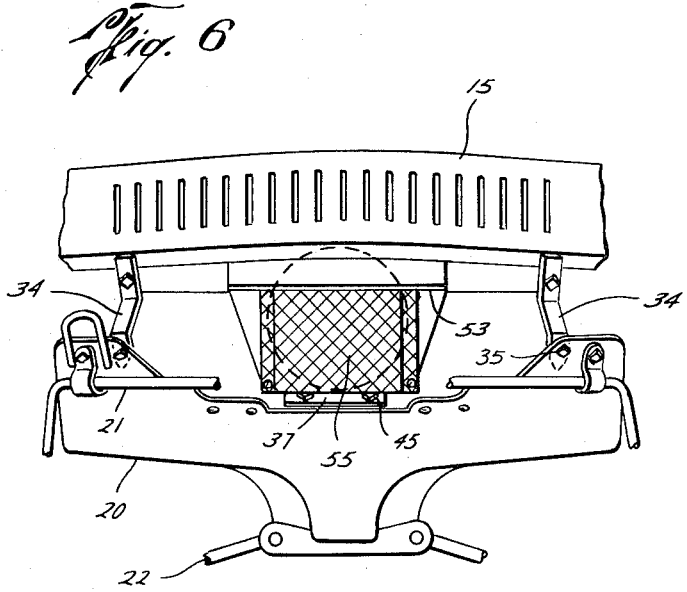

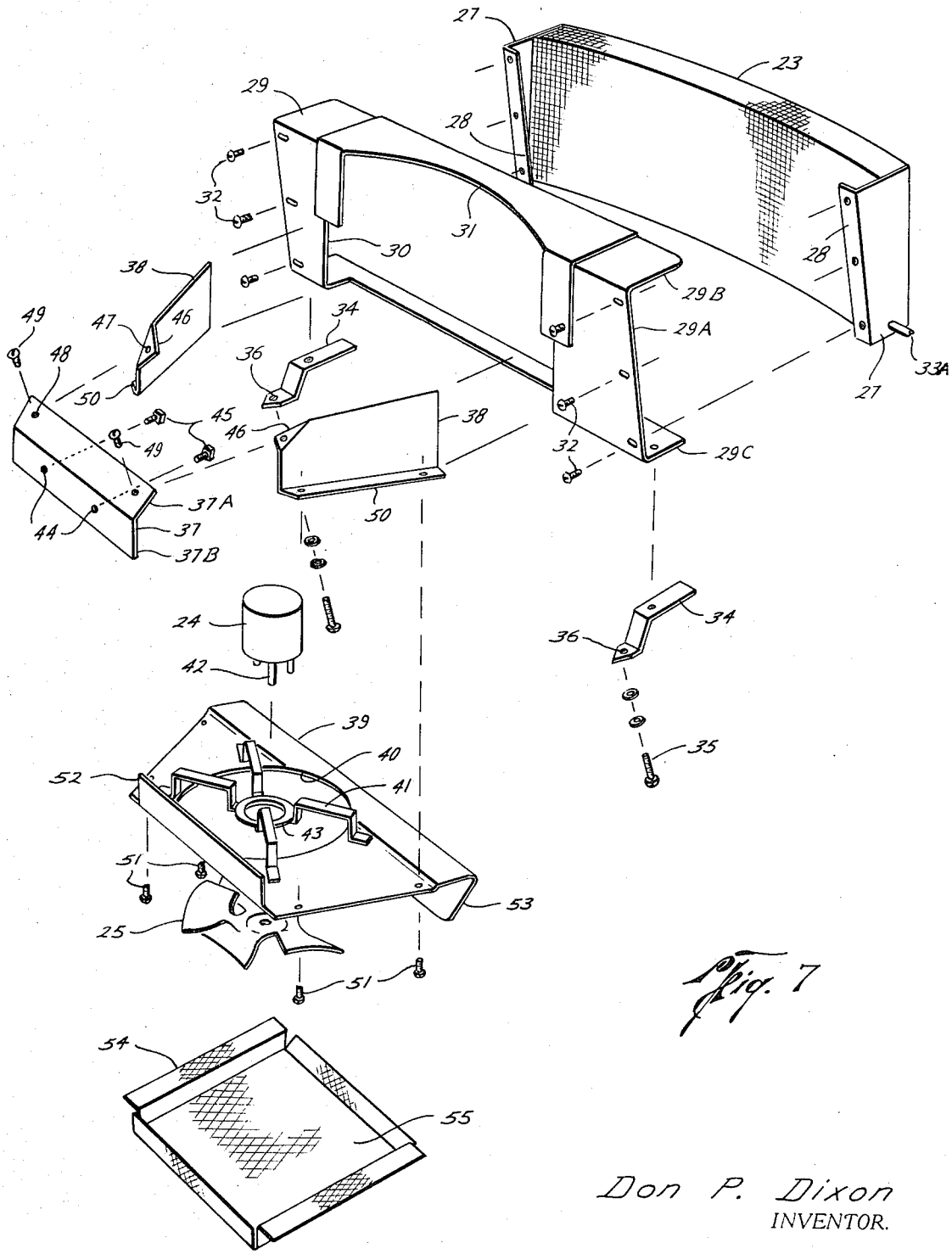

AUTOMOBILE AIR CONDITIONING SYSTEM

This invention relates to an air conditioning system for an automobile; and, more particularly, an improved condenser assembly of such a system which is especially adapted for a compact, motor-in-the-rear type automobile, such as the 1971 model Volkswagen "Super Bug".

Conventional air conditioning systems are not suited for compact automobiles of this type where space is at a premium. Thus, there is a problem in finding room for the components of the system, including the condenser assembly, at least without major modifications of the construction of the automobile. In other vehicles of this type, such as those shown and described in U. S. Pat. Nos. 3,381,492 and 3,384,297, it has therefore been proposed to mount the condenser assembly within a space between the front axle and a compartment in which the spare tire is stored in a generally upright position.

In the 1971 Volkswagen "Super Bug", the spare tire is stored in generally horizontal position above the front axle so as to provide a structural support against compressive loads in the case of front-end collisions, and the front end of the compartment in which it is received is close behind an upper portion of a ventilated grill across the front end of the automobile. Also, much of the space beneath the front portion of the spare tire compartment and between the lower portion of the grill and a vertical wall of the automobile frame is occupied by a panel which is connected to the wall to cover the front end of a tunnel which extends rearwardly into the frame.

An object of this invention is to provide an air conditioning system having a condenser assembly which may nevertheless be mounted behind the ventilated grill of such an automobile, without major modification to the automobile; and, more particularly, with no modification other than the removal of the panel across the front end of the tunnel.

Another object is to provide such a system in which, during installation, the panel may be removed and at least a part of the condenser assembly mounted on the automobile frame by means of parts by which the panel was connected to the frame and in such a manner as to cover the front end of the tunnel.

A further object is to provide such a condenser assembly which is of simple and compact construction and which is easy to install and repair.

These and other objects are accomplished, in accordance with the illustrated embodiment of the present invention, by a condenser assembly comprising a coil mounted in the space between the upper portion of the grill and the front end of the spare tire compartment, and a fan mounted in the space between the lower portion of the grill and the front end of the tunnel for drawing air through the coil. In the installation of the assembly, the panel is removed from across the front end of the tunnel to permit the coil to be moved through the space previously occupied by the panel and into its mounted position, and the fan is then moved into its mounted position within such space.

The condenser assembly includes a housing for the fan blade which has side walls movable with the blade into the space previously occupied by the panel so as to confine air flow from the coil into the fan. Preferably, the housing has a bottom wall which extends between the side walls and has a hole in which the blade is rotatable. Each of the coil and fan is separably mounted on the automobile frame by brackets on the coil and a rear wall of the fan housing, respectively, which are both bolted to holes in the frame to which the panel was removably bolted.

In the drawings, wherein like reference characters are used throughout to designate like parts:

FIG. 4 is a view of a portion of the front end of the automobile, looking upwardly and rearwardly and showing the panel in broken line and the bolts by which the panel is mounted to the automobile frame removed from the holes in the wall;

FIG. 5 is a perspective view of the front end of the automobile, looking from front, below and right side thereof, during installation of the coil into mounted position behind the ventilated grill;

FIG. 6 is a view similar to FIG. 4, but upon installation of the coil and the fan and its housing into mounted positions; and FIG. 7 is an exploded perspective view of the condenser assembly.

Figure 1:
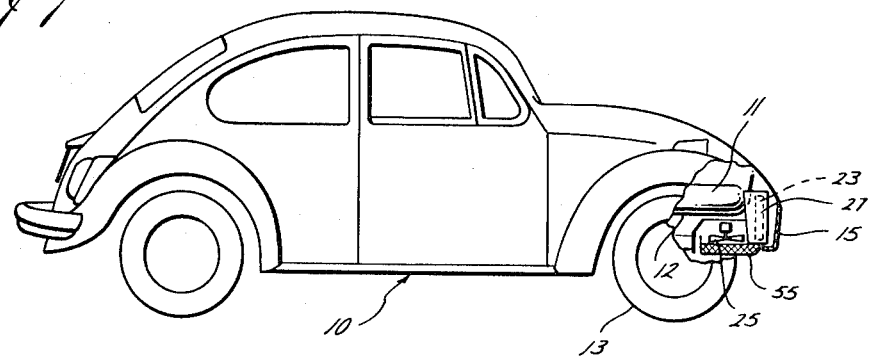
FIG. 1 is a side view of a 1971 model Volkswagen "Super Bug" automobile, having a portion of its front end broken away to show a condenser assembly installed in accordance with the present invention.
Figure 2:
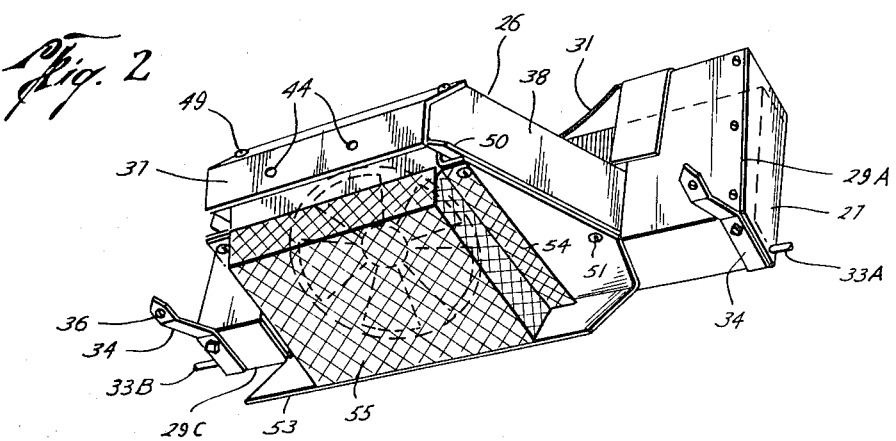
FIG. 2 is a perspective view from the rear, bottom and right side of the condenser assembly removed from the automobile.
Figure 3:
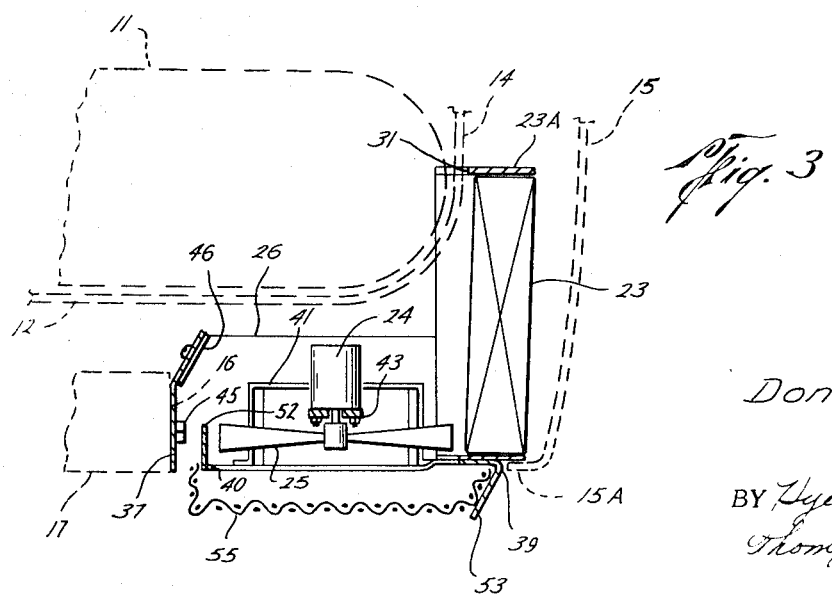
FIG. 3 is a vertical sectional view of the condenser assembly, with adjacent parts of the automobile shown in broken lines.

With reference now to the details of the above-described drawings, and particularly FIG. 1, the automobile shown therein, and designated in its entirety by reference character 10, has a motor (not shown) mounted in a rear compartment intermediate its rear end and the passenger compartment. As previously described, this automobile also has a front compartment for storing a spare tire 11 intermediate its front end and the passenger compartment. As shown by the cutaway portion of FIG. 1 as well as by the broken lines of FIG. 3, this compartment is located vertically between the hood of the automobile and a horizontally extending wall 12 of the frame of the automobile above the axle for the front wheels 13. As also shown in FIGS. 1 and 3, and as previously described, the spare tire 11 lies flat on the horizontal wall 12 so as to provide a structural member resisting compressive loads, such as might occur upon a front end collision of the automobile, and a laterally arcuate wall 14 of the frame curves upwardly from the wall 12 and closely about the front end of the tire.

A ventilated grill 15 extends across the front end of the automobile and is spaced relatively near the upwardly extending front wall 14 of the spare tire compartment. The frame of the automobile also includes a vertical, laterally extending wall 16 beneath the spare tire compartment and spaced rearwardly of its front end. A tunnel 17 (see FIG. 3) extends within the frame rearwardly from the wall 16 and generally intermediate opposite sides of the automobile.

Normally, the front end of the tunnel 17 is covered by a panel 18 (see broken lines in FIG. 4) which is releasably connected to the frame by means of a series of bolts 19a, 19b, 19c, 19d, 19e, 19f, 19g and 19h. As best shown in FIG. 4, all such bolts extend into holes within a yoke 20 of the frame of the automobile which extends generally rearwardly from the front wall 16 beneath the panel 17, with the exception of bolts 19d and 19e which extend into threaded holes in the wall 16. As shown in FIGS. 4 to 6, the yoke 20 supports an anti-sway bar 21 as well as struts 22 which are pivotally connected at their outer ends to the opposite ends of the anti-sway bar.

In accordance with the present invention, the above-described bolts are removed to permit removal of the panel 18, which in turn opens up the space between the wall 16 of the frame and the lower portion of the grill 15, and thus provides access into the otherwise unused space between the wall 14 of the spare tire compartment and the upper portion of the grill 15. As will be described to follow, the holes into which the bolts 19a, 19d, 19e and 19h extend, so as to releasably connect the panel 18 to the frame of the automobile, are subsequently used in mounting the condenser assembly on the automobile.

The condenser assembly includes a coil 23 and a fan having a motor 24 and a blade 25 which is rotated by the motor, each of which is adapted to be mounted on the automobile in the position shown in FIG. 3. The fan includes a housing 26 which is connected to the automobile frame, to support the fan blade and motor independently of the coil. As previously described, the coil is disposed in an upright position behind the grill 15, with its upper end in front of the spare tire compartment, as shown in FIG. 3, and its lower end spaced forwardly of the vertical wall 16 on the frame, and the housing 26 of the fan is disposed between the lower end of the coil and the frame wall 16 so as to support the fan blade in position for drawing air through the grill 15 and the coil 23 and outwardly beneath the frame of the automobile.

As best shown in FIG. 7, the coil includes a module of finned tubes of more or less conventional construction carried between side walls 27 which extend rearwardly of the rear side of the module and having flanges 28 with holes therein. The coil also has a frame 29 including a rear wall 29A, a top wall 29B and a bottom wall 29C. The front side of the wall 29A is adapted to fit against the flanges 28, and the upper and lower walls 29B and 29C are adapted to fit over the upper and lower ends of the coil module, respectively. When so fitted, the frame is connected to the flanges 28 by means of bolts 32, so that air passing through the coil passes through an opening 30 in the rear side of the frame.

The rear edge above the upper wall 29B is cut away at 31 to fit closely about frame wall 14, and the lower edge of wall 29C is cut away to avoid interference with the fan blade 25. Refrigerant gas may be introduced into the coil through a conduit 33A at one side thereof, and circulated out of the coil through another conduit 33B on the other side thereof.

Upon removal of the panel 18, and as illustrated in FIG. 5, the coil is moved upwardly in front of sway bar 21 into the space between the grill 15 and the wall 14, and then forwardly to support its front lower edge on a rearwardly extending flange 15A along the lower side of the grill. When so positioned, the coil is connected to the frame of the automobile by means of brackets 34 which are connected to the wall 29C at its opposite ends so as to dispose holes 36 in their outer ends in position for connection to yoke 20 of the automobile frame by means of bolts 35 which extend into holes in the yoke provided for bolts 19a and 19h. In fact, the same bolts 19a and 19h may, if long enough, be used for connecting the brackets to the yoke, although longer bolts may be needed.

The fan housing 26 comprises a rear wall 37, side walls 38 extending forwardly from opposite sides of the rear wall, and a bottom wall 39 extending laterally between and forwardly beyond the front side walls 38. The front edges of the side walls are spaced apart a distance corresponding to the width of the opening 30 in the coil frame and, upon connection of the housing to the automobile frame, abut the rear side of the wall 29A adjacent the opposite sides of the opening 30 so as to confine air passing through the opening. As shown in FIG. 3, the forwardly extending portion of the bottom wall 39 is disposed beneath the bottom wall 29C of the coil frame upon installation of the housing 26.

The bottom wall 39 of the fan housing has a hole 40 formed therein to receive the fan blade 25 for rotation about a vertical axis, and thus to draw air passing through the coil into the fan housing and out the lower end thereof beneath the automobile frame. A spider 41 is mounted on the top side of the wall 39 to support the fan motor 24 with its drive shaft 42 extending vertically from the bottom of the motor and through an open ring 43 in the spider 41 for connection with the blade 25.

The fan housing, and thus the fan supported on the housing, is mounted on the automobile frame by the connection of its rear wall 37 to the vertical wall 16 of the frame from which the tunnel 17 extends. Thus, there are holes 44 in the wall 37 through which bolts 45 extend for connection with the threaded holes in the frame wall 16 to which the bolts 19d and 19e are connected for mounting the panel 18 on the frame. In fact, the bolts 19d and 19e may, if long enough, be use in securing the wall 37 to the frame, although longer bolts 45 may be required for this purpose.

Each of the side walls 38 of the fan housing has a tab 46 at the upper rear corner of each side wall which fits against the front side of the forwardly bent portion 37A of the wall 37. When the tabs are so fitted, holes 47 therein are aligned with holes 48 in the rear wall portion 37A so as to permit the side walls to be connected to the rear wall by means of bolts 49 extending through the holes. When so connected, the rear edges of the side walls 38 are disposed adjacent the side edges of the lower portion 37B of the rear wall 37.

The bottom wall 39 of the fan housing is of generally trapezoidal shape for closing the opening defined by the lower edges of the rear wall 37 and side walls 38 when disposed thereagainst. Flanges 50 on the lower edges of the side walls have holes therein adapted to be aligned with holes in the bottom wall and thus permit them to be connected by means of bolts 51. An upwardly turned flange 52 on the rear edge of the bottom wall is spaced in front of the wall 37 and thus the bolts 45 connecting wall 37 to the automobile frame, as shown in FIG. 3, whereby access may be had to the bolts 45 in connecting or disconnecting the fan housing.

When the forwardly extending portion of the bottom wall 39 which is disposed beneath the coil and the bottom wall 29C of its coil frame 29, as shown in FIG. 3, a downwardly and rearwardly turned flange 53 thereon diverts air passing beneath the grill 15 along a path beneath the lower side of the fan 25. A relatively shallow cover 54 of wire mesh is suspended beneath the rear wall 39 with its bottom wall 55 generally on the same level as the lower edge of diverter flange 53, and serves to protect the fan, and particularly the blade 25, from rocks or other particles which might otherwise be deflected upwardly into it from beneath the automobile.

In the assembly of the fan and its housing, the wall 37 is moved up into a position across the front of the tunnel extending rearwardly from the wall 36, and is then connected to the wall by means of bolts 45. This normally requires some tilting of the assembly to clear the sway bar 21. Location of the fan housing in proper position is facilitated, of course, by engagement of the forwardly extending portion of the bottom wall 39 thereof with the bottom wall 29C of the coil frame.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an automobile having a ventilated grill across the front end thereof, a spare tire compartment having a front end spaced rearwardly of an upper portion of the grill, and a frame having a laterally extending, vertically disposed wall below and spaced rearwardly of the front end of the spare tire compartment; an air conditioning system including a condenser assembly, comprising a coil mounted in an upright position behind the grill with its upper end opposite the front end of the spare tire compartment and its lower end opposite and spaced forwardly of the frame wall, and a fan mounted in the space between the frame wall and lower end of the coil for drawing air through the coil.

2. A system of the character defined in claim 1, wherein the fan includes a blade which is rotatable about a substantially vertical axis.

3. A system of the character defined in claim 2, wherein the fan includes a housing having an open front facing the rear side of the coil and opposite side walls for confining air flow from the coil to the fan.

4. A system of the character defined in claim 3, wherein the housing also has a bottom wall extending between the side walls and having a hole in which the fan blade is rotatable.

5. A system of the character defined in claim 4, wherein the housing includes means supporting the fan blade on its bottom wall.

6. A system of the character defined in claim 4, wherein the front edge of the bottom wall of the housing extends forwardly beneath the lower end of the coil, and an air diverter flange extends downwardly from said front edge.

7. In an automobile having a ventilated grill across the front end thereof, a spare tire compartment having a front end spaced rearwardly of an upper portion of the grill, and a frame having a laterally extending, vertically disposed wall below and spaced rearwardly of the front end of the spare tire compartment, a tunnel extending rearwardly from said wall, and a panel releasably connected across the front end of said tunnel in the space rearwardly of the lower portion of the grill; an air conditioning system including a condenser assembly, comprising a coil which, upon removal of said panel, is movable into a position behind the grill with its upper end opposite the front end of the spare tire compartment and its lower end opposite and spaced forwardly of the front end of the tunnel, a fan which, upon movement of the coil into said position, is movable into the space rearwardly of the lower portion of the grill and behind the lower end of the coil for drawing air through the coil, and means including parts on the releasable connection of said panel to said frame for mounting said coil and fan in their respective positions.

8. A system of the character defined in claim 7, wherein the mounting means includes brackets on the coil bolted to the frame by bolt holes to which the panel was bolted to the frame.

9. A system of the character defined in claim 7, wherein the mounting means includes a housing supporting the fan and having a wall bolted to the frame and across the front end of the tunnel by bolt holes to which the panel was bolted to the frame.

10. A system of the character defined in claim 9, wherein the mounting means also includes brackets on the coil bolted to the frame by bolt holes to which the panel was bolted to the frame.

11. A system of the character defined in claim 9, wherein the housing includes side walls extending between the frame wall and the rear side of the coil.

12. A system of the character defined in claim 11, wherein the housing also includes a bottom wall extending between the side walls thereof and having a hole therein, and said fan includes a blade supported on said bottom wall for rotation within said hole.

* * * * *